United States Patent [19]

Nagano

[11] Patent Number: 5,078,653
[45] Date of Patent: Jan. 7, 1992

[54] MULTISTEP SPROCKET WHEEL DEVICE FOR A BICYCLE

[75] Inventor: Masashi Nagano, Izumi, Japan

[73] Assignee: Shimano Industrial Company Limited, Osaka, Japan

[21] Appl. No.: 515,519

[22] Filed: Apr. 27, 1990

[30] Foreign Application Priority Data

May 1, 1989 [JP] Japan .................................. 1-112422

[51] Int. Cl.⁵ .............................................. F16H 9/06
[52] U.S. Cl. ...................................... 474/78; 474/160
[58] Field of Search ................................. 474/77–79, 474/155–158, 160

[56] References Cited

U.S. PATENT DOCUMENTS

| | | | |
|---|---|---|---|
| 3,661,021 | 5/1972 | Ohshita | 474/160 X |
| 3,772,932 | 11/1973 | Nagano | 474/160 |
| 4,268,259 | 5/1981 | Segawa et al. | 474/160 |

FOREIGN PATENT DOCUMENTS

| | | | |
|---|---|---|---|
| 008285 | 6/1980 | Japan | 474/78 |
| 55-28617 | 7/1980 | Japan . | |

Primary Examiner—Thuy M. Bui
Attorney, Agent, or Firm—Dickstein, Shapiro & Morin

[57] ABSTRACT

A multistep sprocket wheel device for a bicycle according to the present invention has at least one large sprocket wheel (1) and one small sprocket wheel (2) disposed adjacent each other. The two sprocket wheels (1, 2) are assembled such that a distance between a first pitch center (01) of one of the teeth on the large sprocket wheel (1) and a second pitch center (02) on the small sprocket wheel (2) adjacent a tangential line of the small sprocket wheel (2) extending rearwardly from the first pitch center (01) with respect to a direction of rotation of the sprocket wheels (1, 2) is substantially a product of a pitch of a chain (3) multiplied by an integer.

The present invention is characterized in that a chain support (12) is provided adjacent the first tooth (11) for receiving a portion of the chain (3) located on a side of the first tooth (11) opposed to the small sprocket wheel (2) when the chain (3) disengages toward the small sprocket wheel (2) from the first tooth (11) and an adjacent tooth arranged forwardly of the first pitch center (01) with respect to the direction of rotation.

19 Claims, 3 Drawing Sheets

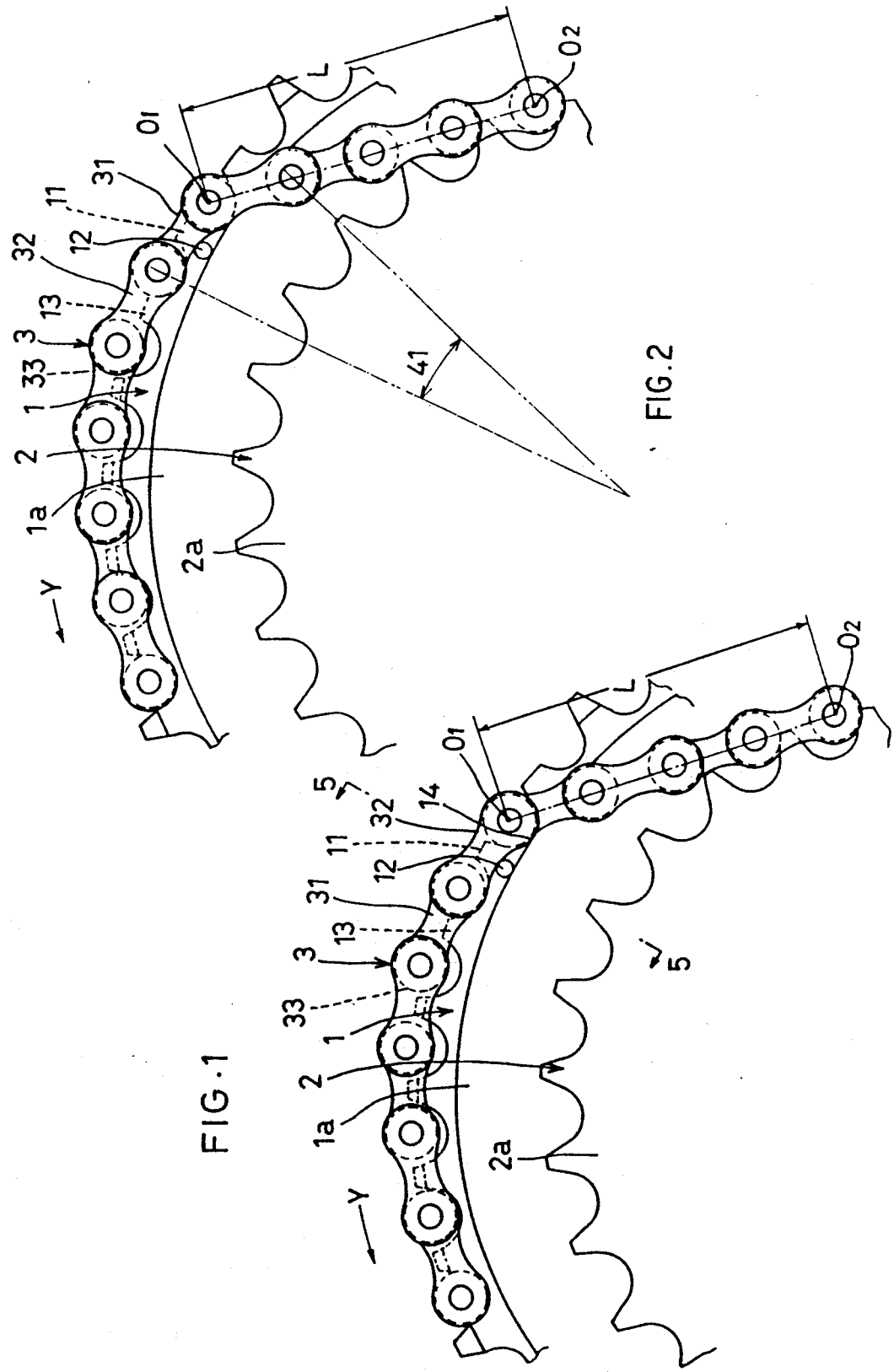

MULTISTEP SPROCKET WHEEL DEVICE FOR A BICYCLE

BACKGROUND OF THE INVENTION

1. Field of the Invention

The present invention relates to a multistep sprocket wheel device for a bicycle. More particularly, the invention relates a sprocket wheel device including at least one large sprocket wheel and one small sprocket wheel disposed adjacent to each other, each sprocket wheel defining a plurality of teeth peripherally thereof for engaging a chain. The two sprocket wheels are assembled such that a distance between a first pitch center of one of the teeth on the large sprocket wheel and a second pitch center on the small sprocket wheel adjacent a tangential line of the small sprocket wheel extending rearwardly from the first pitch center with respect to a direction of rotation of the sprocket wheels is substantially a product of a chain pitch multiplied by an integer.

2. Description of the Prior Art

A term used in this specification will be defined here. "The chain disengages or is disengaged from a certain tooth of the large sprocket wheel." means "The chain remains engaged with teeth located forwardly of the above certain tooth with respect to a direction of rotation of the sprocket wheels, and disengages or become disengaged from the certain tooth and teeth located rearwardly with respect to the direction of rotation to move toward the small sprocket wheel."

A known multistep sprocket wheel device for a bicycle as noted above is disclosed in U.S. Pat. No. 4,268,259, for example.

This known device includes a large sprocket wheel defining a ready engagement type tooth among its peripheral teeth. In order for the chain to correctly engage a tooth adjacent the ready engagement type tooth when changing from small sprocket wheel to large sprocket wheel, a distance between one pitch center adjacent the ready engagement type tooth and one pitch center adjacent of one of the teeth of the small sprocket wheel from which the chain disengages is substantially a product of a chain pitch multiplied by an integer as noted above.

The above known device may be modified to assemble the two sprocket wheels such that, in order to allow a smooth change from large sprocket wheel to small sprocket wheel, the above distance between the first and second pitch centers has an appropriate value.

Such a modification, however, does not provide for a smooth change from large sprocket wheel to small sprocket wheel when the chain disengages from a tooth other than the (first) tooth serving as a reference for adjusting the distance between the first and second pitch centers. In this case, the chain will mount tooth crests instead of correctly engaging the teeth of the small sprocket wheel since the chain is displaced to a great extent from the first pitch center toward the center of the sprocket wheels.

In the above modification, the large sprocket wheel may define a ready disengagement tooth or teeth for allowing the chain to readily disengage toward the small sprocket wheel from at least the first tooth and teeth adjacent and forwardly thereof in the direction of rotation, and may be formed of a metal such as aluminum which has a low abrasion resistance. In this case, the large sprocket wheel will become worn locally at positions adjacent the first tooth and on the side opposed to the small sprocket wheel through sliding contact with the chain. At an advanced stage of wear of the large sprocket wheel, as shown in FIG. 6, the chain 3' having disengaged from the first tooth or adjacent teeth and moving to the small sprocket wheel 2' falls toward the center of the sprocket wheels and becomes inclined at a large angle 40' to the large sprocket wheel compared with an originally designed angle as shown in a solid line. As a result, the curve of the chain 3' being shifted reaches its limit, whereby the chain tends to fall over to the side of the small sprocket wheel 2' away from the large sprocket wheel 1'.

SUMMARY OF THE INVENTION

An object of the present invention is to provide a multistep sprocket wheel device for a bicycle which allows the chain to engage the small sprocket wheel smoothly even when the chain disengages from a tooth adjacent the first tooth serving as the reference for positional adjustment of the two sprocket wheels and even when the large sprocket wheel becomes worn to some extent.

The above object is achieved, according to the present invention, by a chain support provided adjacent the first tooth for receiving a portion of the chain located on a side of the first tooth opposed to the small sprocket wheel when the chain disengages toward the small sprocket wheel from the first tooth and an adjacent tooth arranged forwardly of the first pitch center with respect to the direction of rotation.

With the above construction, the disengaged chain is received by the chain support and does not become displaced to a large extent toward the center of the sprocket wheels even when the chain disengages from a second tooth located forwardly of the first tooth with respect to the direction of rotation. The chain disengaged from the second tooth moves toward the small sprocket wheel in substantially the same manner as when disengaging from the first tooth. Consequently, the chain will correctly engage the teeth of the small sprocket wheel to assure a smooth change gear operation.

The large sprocket wheel may include ready disengagement type teeth for facilitating disengagement of the chain toward the small sprocket wheel from the first tooth and adjacent tooth arranged forwardly with respect to the direction of rotation. According to the present invention, the chain repeatedly disengaged from the first tooth or teeth adjacent thereto does not make a sliding contact with the large sprocket wheel. Thus, the large sprocket wheel is protected from wear, and the chain disengaged from the large sprocket wheel is maintained in an approximately fixed posture to assure high change gear efficiency.

The chain support may comprise a projection, or may be formed by cutting out a portion of a side face of the large sprocket wheel adjacent the first tooth.

Other objects, features and advantages of the present invention will be apparent from the following description of the preferred embodiment.

BRIEF DESCRIPTION OF THE DRAWINGS

FIGS. 1 and 2 are partial front views of multi-step sprocket wheel device according to the present invention, showing the way in which a chain is changed from a large sprocket wheel to a small sprocket wheel.

DESCRIPTION OF THE PREFERRED EMBODIMENT

Figure 3:
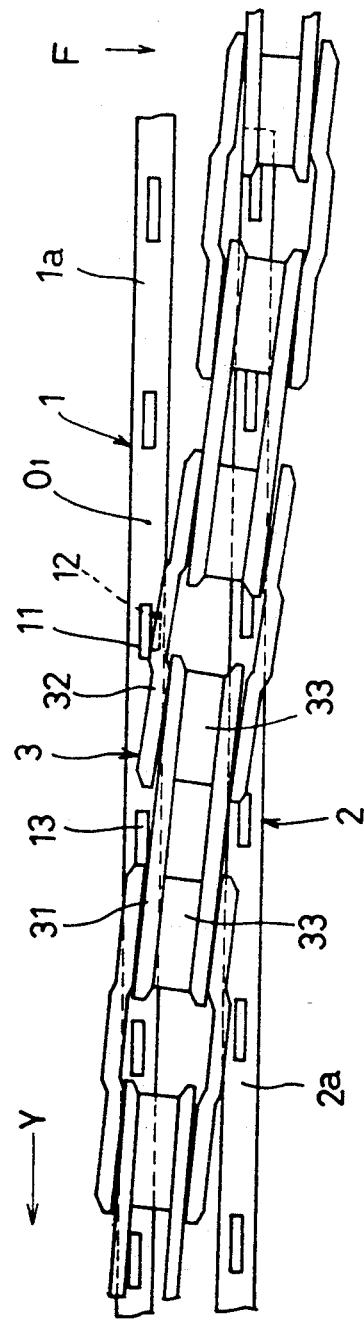
FIG. 3 is an enlarged plan view corresponding to FIG. 1.

An embodiment of the present invention will be described with reference to the drawings.

As shown in FIGS. 1 through 4, a multistep sprocket wheel device according to the present invention comprises a large sprocket wheel 1 having a main wheel body 1a defining a plurality of teeth peripherally thereof, and a small sprocket wheel 2 having a main wheel body 2a defining a plurality of teeth peripherally thereof. A chain 3 is passed around the large sprocket wheel 1 or small sprocket wheel 2 and a rear sprocket wheel not shown. The chain 3 includes inner plates 31 and outer plates 32 arranged in respective pairs and acting as link plates, and rollers 33 mounted between opposing ends of the inner plates 31. The chain is movable axially of the large and small sprocket wheels 1 and 2 to change from one sprocket wheel to the other by a front derailleur disposed radially outwardly of the small sprocket wheel 2. Thus, a pedal treading force is transmitted to the rear wheel at a selected change speed ratio. These sprocket wheels, during a normal bicycle run, rotate in the direction indicated by an arrow Y in the drawings. The sprocket wheels 1 and 2 are formed mainly of a light metal such as aluminum, but this is not limitative.

The pedal treading force becomes small at an upper dead point and a lower dead point because of a crank construction not shown. The large sprocket wheel 1 includes a first tooth 11 and a second tooth 13 acting as ready disengagement type teeth at positions corresponding to the two dead points, so that the chain 3 may easily be changed from the large sprocket wheel 1 to the small sprocket wheel 2 with a small operating force. As shown in FIG. 1, the first and second ready disengagement type teeth 11 and 13 have a reduced height with crests thereof cut off. A plurality of teeth (two teeth in the drawings) adjacent the second tooth 13 forwardly thereof with respect to the direction of rotation, preferably, are inclined within the thickness of the wheel body 1a and inwardly from the side remote from the small sprocket wheel 2 relative to the centerline of the width. This further facilitates chain disengagement from the teeth 11 and 13.

The large sprocket wheel 1 includes a projection formed on a side thereof opposed to the small sprocket wheel 2 and adjacent the first tooth 11 to act as a chain support 12 for receiving a link plate of the chain 3 having disengaged from the first tooth 11 or second tooth 13. This chain support 12 is so positioned as to support the bottom of a link plate lying laterally of the first tooth 11, whether the chain 3 disengages from the first tooth 11 or from the second tooth 13. As a result, the disengaged chain 3 is caused to bend toward the small sprocket wheel 2 about a position substantially corresponding to a first pitch center $0_1$ adjacent the first tooth 11 and rearwardly thereof in the direction of rotation. It is necessary to provide the chain support 12 in a state not to obstruct engagement between the chain 3 and other ordinary teeth of the large sprocket wheel 1. Preferably, the chain support 12 is formed of a harder material than the sprocket wheels 1 and 2. In this embodiment, a hard metallic pin is inserted into the large sprocket wheel 1. Instead, a portion of the large sprocket wheel 1 may be formed to project from the rest.

In this way, the disengaged chain 3 is bent substantially about the first pitch center $0_1$ when changing from the large sprocket wheel 1 to the small sprocket wheel 2. Thus, a smooth engagement between the chain 3 and teeth of the small sprocket wheel 2 is secured by positionally adjusting the teeth of the small sprocket wheel 2 using the first pitch center $0_1$ as a reference. More particularly, the two sprocket wheels 1 and 2 are assembled such that a distance between the first pitch center $0_1$ and a second pitch center $0_2$ on the small sprocket wheel 2 adjacent a tangential line of the small sprocket wheel 2 extending rearwardly from the first pitch center $0_1$ with respect to the direction of rotation of the sprocket wheels 1 and 2 is substantially a product of the pitch of the chain 3 multiplied by an integer.

Next, the way in which the chain 3 engages the two sprocket wheels 1 and 2 when shifted by the derailleur will be described with reference to FIGS. 1 through 4.

Figure 4:
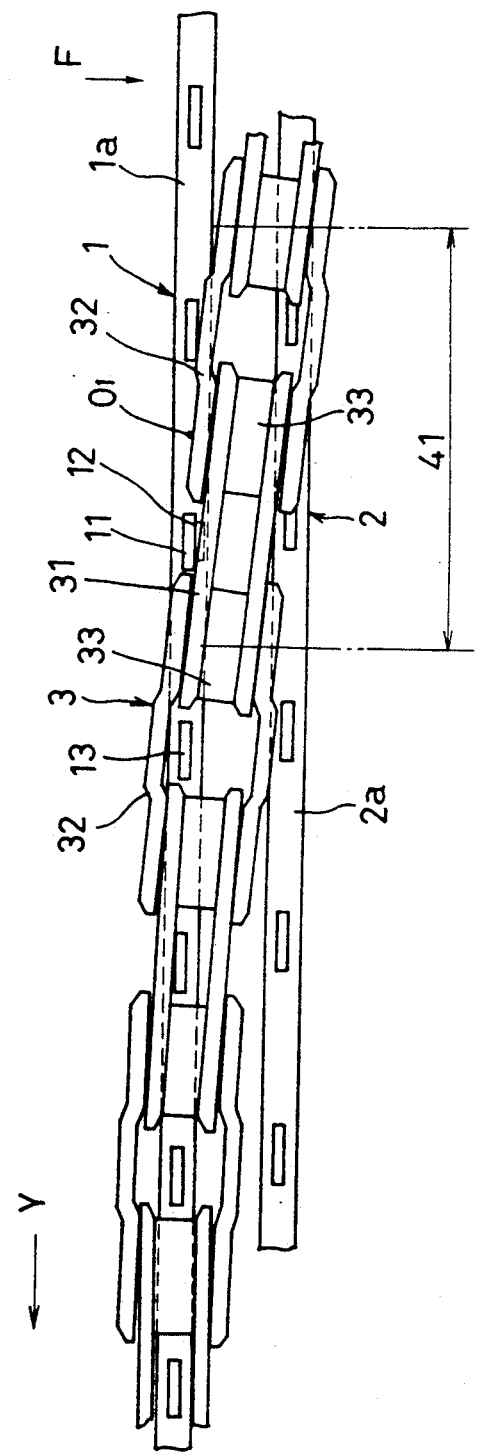
FIG. 4 is an enlarged plan view corresponding to FIG. 2.

FIGS. 3 and 4 shows a state in which the chain 3 is changed from the large sprocket wheel 1 to the small sprocket wheel 2 by moving the chain guide of the derailleur in the direction indicated by an arrow F. When the chain 3 engaging the teeth of the large sprocket wheel 1 is shifted by the derailleur, the portion of the chain 3 acted on by the derailleur is moved to a position radially outwardly of the small sprocket wheel 2 and becomes inclined. At this time, the chain portion located forwardly with respect to the direction of rotation (the direction indicated by arrow Y) of the two sprocket wheels 1 and 2 remains on the large sprocket wheel 1. The chain portion engaging the large sprocket wheel 1 becomes disengaged from the first tooth 11 or second tooth 13. That is, when the inner plate 31 lies adjacent the first tooth 11, the chain portion disengages from the first tooth 11 as shown in FIGS. 2 and 4. When the inner plate 31 lies adjacent the second tooth 13, the chain portion disengages from the second tooth 13 as shown in FIGS. 1 and 3.

When the inner plate 31 disengages from the second tooth 13 as shown in FIGS. 1 and 3, the outer plate 32 next to the disengaged inner plate 31 with respect to the direction of movement is received at a longitudinally intermediate position thereof by the chain support 12. Consequently, the disengaged chain 3 bends from the first pitch center $0_1$ toward the small sprocket wheel 2. On the other hand, when the inner plate 31 disengages from the first tooth 11 as shown in FIGS. 2 and 4, the inner plate 31 is received at a longitudinally intermediate position thereof by the chain support 12. The disengaged chain 3, again, bends from the first pitch center $0_1$ toward the small sprocket wheel 2. In this way, the chain 3 moves from the first pitch center $0_1$, to which the positional adjustment has been made, toward the small sprocket wheel 2 whether the inner plate 31 disengages from the first tooth 11 or the second tooth 13. This facilitates a change from the large sprocket wheel 1 to the small sprocket wheel 2.

Figure 5:
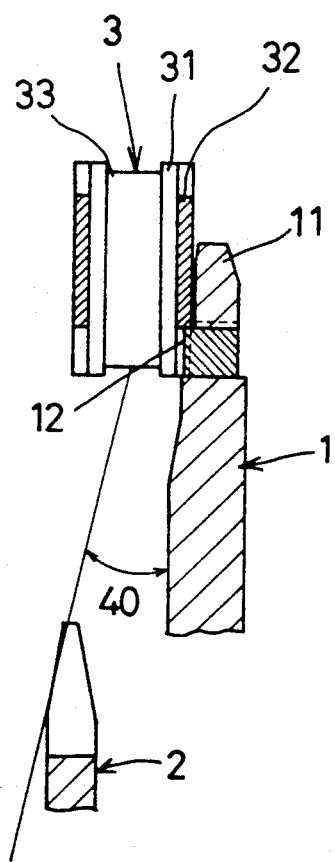
FIG. 5 is a section taken on line 5—5 of FIG. 1.
Figure 6:
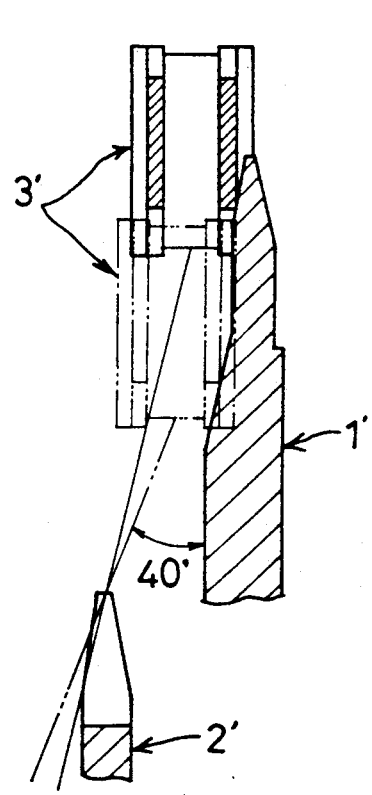
FIG. 6 is a view illustrating a conventional device.

When the inner plate 31 disengages from the first tooth 11, the inner plate 31 is received by the chain support 12 as shown in FIGS. 2 and 5. Consequently, the inner plate 31 will not be displaced relative to the first pitch center $0_1$ toward the center of the wheel body 1a. Even when the large sprocket wheel 1 becomes worn, the chain 3 changing from the large sprocket wheel 1 to the small sprocket wheel 2 has an appropriate angle 40 to the side face of the wheel body. The chain portion moving toward the small sprocket wheel 2 smoothly engages the teeth of the small sprocket wheel 2.

The present invention includes the following modifications.

I. In the described embodiment, the chain support 12 is in the form of a projection on the side of the large sprocket wheel 1. The chain support 12 may comprise a step formed by cutting out a portion of the side of the large sprocket wheel 1 adjacent the first tooth 11 and opposed to the small sprocket wheel 2. The step thus formed will serve the purpose if shaped, by taking the lateral profile of the link plates forming the chain 3, to support the bottom of at least the link plate located laterally of the first tooth 11. The step may be formed over a region referenced 41 in FIGS. 2 and 4, i.e. a range extending from a position adjacent the first tooth 11 rearwardly with respect to the direction of rotation. This will reduce the inclination 40 of the shifted chain 3, to promote gear change efficiency. Preferably, the step formed by the cutout is finished hard by quenching or coating.

II. In the described embodiment, the ready disengagement type teeth 11 and 13 are arranged at positions corresponding to the upper and lower dead points on the large sprocket wheel 1 in relation to the cranks. However, these teeth 11 and 13 may be arranged at other locations. Such ready disengagement type may not be formed at all.

III. In the described embodiment, the chain disengaged from the large sprocket wheel 1 is received by the chain support 12 whether the chain disengages from the first tooth 11 or the second tooth 13. This aspect may be modified so that the chain is received by the chain support 12 only when disengaged from the second tooth 13.

IV. Where the first and second teeth 11 and 13 comprise the ready disengagement type, various modifications may be made to the device for facilitating disengagement. For example, the teeth 11 and 13 may be inclined within the thickness of the wheel body 1a and outwardly from the side opposed to the small sprocket wheel 2 relative to the centerline of the width. Further, the teeth 11 and 13 may be inclined within the thickness of the wheel body 1a and relative to the centerline of the width, outwardly from the side opposed to the small sprocket wheel 2 and forwardly with respect to the direction of rotation.

V. While the foregoing embodiment comprises a combination of two sprocket wheels, three or more sprocket wheels may be provided. Moreover, the present invention may be embodied into a rear sprocket wheel device as well as a front sprocket wheel device.

What is claimed is:

1. A multistep sprocket wheel device for a bicycle having at least one large sprocket wheel and one small sprocket wheel disposed adjacent each other, each of the sprocket wheels defining a plurality of teeth for engagement with a chain, wherein the two sprocket wheels are assembled such that a distance between a first pitch center of a first tooth on the large sprocket wheel and a second pitch center on the small sprocket wheel adjacent a tangential line of the small sprocket wheel extending rearwardly from the first pitch center with respect to a direction of rotation of the sprocket wheels is substantially a product of a chain pitch multiplied by an integer, characterized in that a chain support is provided adjacent said first tooth for receiving a portion of said chain located on a side of said first tooth opposed to said small sprocket wheel when said chain disengages toward said small sprocket wheel from said first tooth and an adjacent tooth arranged forwardly of said first pitch center with respect to the direction of rotation.

2. A multistep sprocket wheel device as claimed in claim 1, characterized in that said large sprocket wheel includes ready disengagement means for facilitating disengagement of said chain toward said small sprocket wheel from said first tooth and said adjacent tooth arranged forwardly with respect to the direction of rotation.

3. A multistep sprocket wheel device as claimed in claim 2, characterized in that said chain support projects toward said small sprocket wheel from a side face adjacent said first tooth and opposed to said small sprocket wheel.

4. A multistep sprocket wheel device as claimed in claim 2, characterized in that said chain support is formed by cutting out a portion of a side face of said large sprocket wheel adjacent said first tooth and opposed to said small sprocket wheel.

5. A multistep sprocket wheel device as claimed in claim 4, characterized in that said chain support is formed to fit with a lateral profile of link plates forming said chain.

6. A multistep sprocket wheel device as claimed in claim 5, characterized in that said chain support is formed over a range extending from a position adjacent said first tooth rearwardly with respect to the direction of rotation.

7. A multistep sprocket wheel device as claimed in any one of claims 2 to 6, characterized in that said ready disengagement are for facilitating disengagement of said chain from said first tooth and said adjacent tooth arranged forwardly with respect to the direction of rotation.

8. A multistep sprocket wheel device for a bicycle comprising:

a large sprocket wheel and a small sprocket wheel disposed adjacent each other, each of the sprocket wheels defining a plurality of teeth in a periphery thereof for engagement with a chain, the sprocket wheels being assembled such that a distance between a first pitch center of one of the teeth on the large sprocket wheel and a second pitch center on the small sprocket wheel adjacent a tangential line of the small sprocket wheel extending rearwardly from the first pitch center with respect to a direction of rotation of the sprocket wheels is substantially a product of a chain pitch multiplied by an integer, and a chain support provided adjacent the first tooth for receiving a portion of said chain located on a side of said first tooth opposed to said small sprocket wheel when said chain disengages toward said small sprocket wheel from said first tooth or second tooth such that said chain is bendable at a position adjacent said first pitch center.

9. A multistep sprocket wheel device as claimed in claim 8, further including ready disengagement means for facilitating disengagement of said chain at least toward said small sprocket wheel from a first tooth arranged forwardly of said first pitch center with respect to the direction of rotation or a second tooth adjacent the first tooth and arranged forwardly with respect to the direction of rotation.

10. A multistep sprocket wheel device as claimed in claim 9, characterized in that said chain support projects towards said small sprocket wheel from a side face adjacent said first tooth and opposed to said small sprocket wheel.

11. A multistep sprocket wheel device as claimed in claim 9, characterized in that said chain support is formed by cutting out a portion of a side face of said large sprocket wheel adjacent said first tooth and opposed to said small sprocket wheel.

12. A multistep sprocket wheel device as claimed in claim 9, characterized in that said chain support is formed to fit with a lateral profile of link plates forming said chain.

13. A multistep sprocket wheel device as claimed in claim 12, characterized in that said chain support is formed over a range extending from a position adjacent said first tooth rearwardly with respect to the direction of rotation.

14. A multistep sprocket wheel device for a bicycle comprising:

a large sprocket wheel and a small sprocket wheel disposed adjacent each other, each of the sprocket wheels defining a plurality of teeth in a periphery thereof for engagement with a chain, the sprocket wheels being assembled such that a distance between a first pitch center of one of the teeth on the large sprocket wheel and a second pitch center on the small sprocket wheel adjacent a tangential line of the small sprocket wheel extending rearwardly from the first pitch center with respect to a direction of rotation of the sprocket wheels is substantially a product of a chain pitch multiplied by an integer, and a chain support provided adjacent the first tooth for receiving a portion of said chain located on a side of said first tooth opposed to said small sprocket wheel when said chain disengages toward said small sprocket wheel from said first tooth or second tooth such that said chain is bendable at said first pitch center.

15. A multistep sprocket wheel device as claimed in claim 14, further including ready disengagement means for facilitating disengagement of said chain at least toward said small sprocket wheel from a first tooth arranged forwardly of said first pitch center with respect to the direction of rotation or a second tooth adjacent the first tooth and arranged forwardly with respect to the direction of rotation.

16. A multistep sprocket wheel device as claimed in claim 15, characterized in that said chain support projects toward said small sprocket wheel from a side face adjacent said first tooth and opposed to said small sprocket wheel.

17. A multistep sprocket wheel device as claimed in claim 15, characterized in that said chain support is formed by cutting out a portion of a side face of said large sprocket wheel adjacent said first tooth and opposed to said small sprocket wheel.

18. A multistep sprocket wheel device as claimed in claim 15, characterized in that said chain support is formed to fit with a lateral profile of link plates forming said chain.

19. A multistep sprocket wheel device as claimed in claim 18, characterized in that said chain support is formed over a range extending from a position adjacent said first tooth rearwardly with respect to the direction of rotation.

* * * * *